United States Patent [19]

Gregoris

[11] Patent Number: 5,282,013
[45] Date of Patent: Jan. 25, 1994

[54] PASSIVE RANGING TECHNIQUE FOR INFRARED SEARCH AND TRACK (IRST) SYSTEMS

[75] Inventor: Dennis J. Gregoris, Etobicoke, Canada

[73] Assignee: Spar Aerospace Limited, Ontario, Canada

[21] Appl. No.: 903,921

[22] Filed: Jun. 26, 1992

[51] Int. Cl.⁵ .......................... G01C 3/08; F41G 7/00; G01J 1/20

[52] U.S. Cl. ........................................ 356/4; 244/3.16; 250/203.3; 250/206.1; 250/206.2; 250/342; 342/351; 356/141; 356/152

[58] Field of Search ............................ 356/4, 141, 152; 250/203.3, 206.1, 206.2, 342; 244/3.16; 342/351

[56] References Cited

U.S. PATENT DOCUMENTS

| | | | |
|---|---|---|---|
| 3,698,816 | 10/1972 | Lutchansky | 356/152 |
| 3,897,151 | 7/1975 | Lecroy | 356/4 |
| 4,097,007 | 6/1978 | Fagan et al. | 244/3.14 |
| 4,497,065 | 1/1985 | Tisdale et al. | 356/4 |
| 4,867,556 | 9/1989 | Bjorkman | 356/152 |

OTHER PUBLICATIONS

N. Leonpacher, "Passive Infrared Ranging", AFIT/GEP/PH/83D-5 MS Thesis Air Force Institute of Technology Wright-Patterson Air Force Base, Ohio (1984).

*Primary Examiner*—Stephen C. Buczinski

[57] ABSTRACT

In an IRST system, a determination of the range and type of a detected target may be made as follows. Atmospheric transmittance and background spectral radiance is estimated from available meteorological data and then, at each of consecutive scans, the contrast irradiance in the direction of a target is measured as well as the azimuth and elevation of said target. A target type is selected from a library of target types storing signatures of the target types considering the measured contrast irradiance as well as the measure of the contrast irradiance at the previous scan (if any). The range of the target is calculated considering the selected target type, the estimated atmospheric parameters and the measured contrast irradiance. Where the target has other than a radially inbound trajectory the trajectory of the target is estimated and the target type selected from the library, considering the estimated trajectory. The range of the target is estimated considering the selected target type, the angular movement of the target, and the range estimate for the target made during the last scan. Given two range estimates, the estimates are combined.

19 Claims, 6 Drawing Sheets

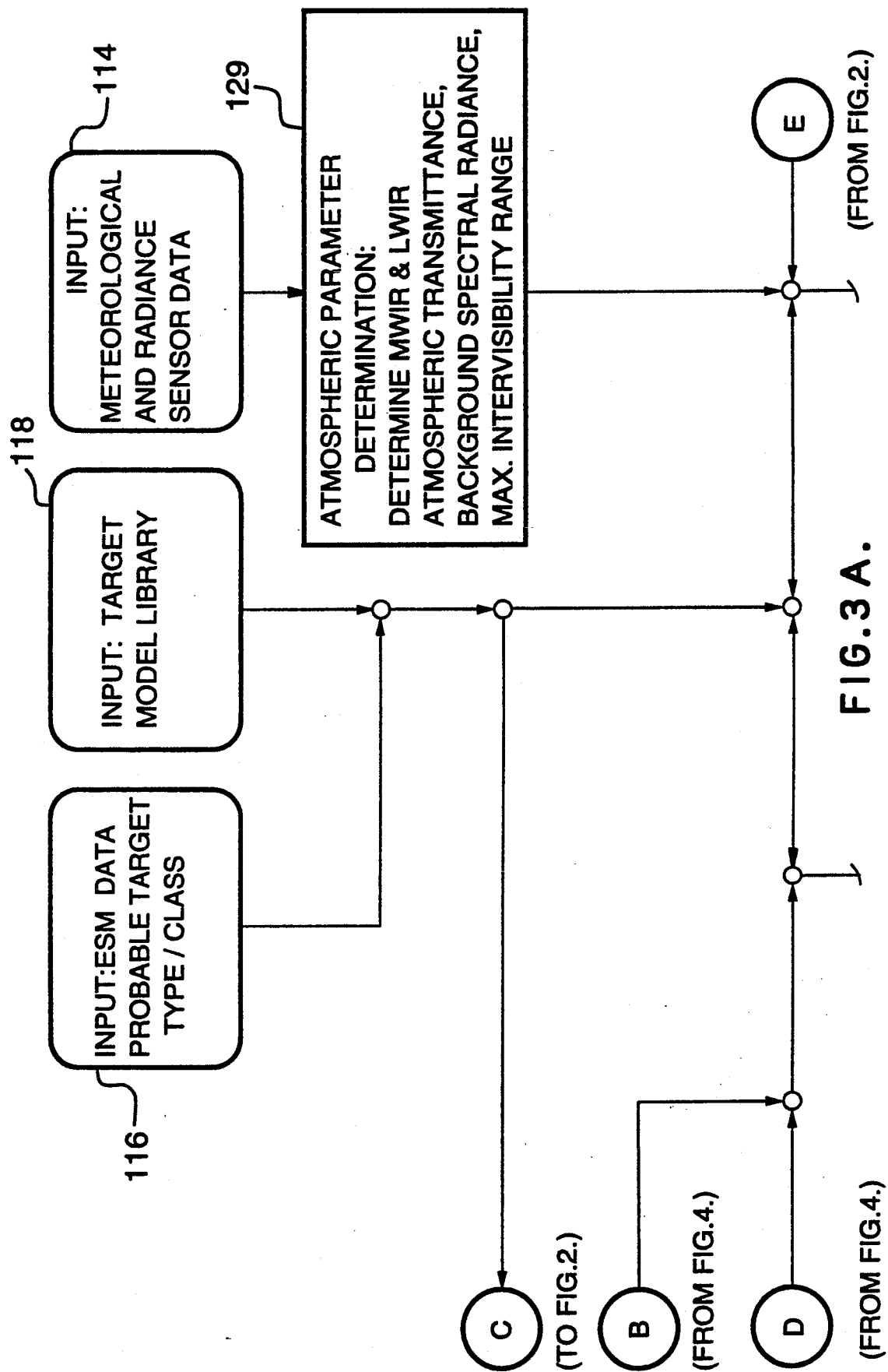

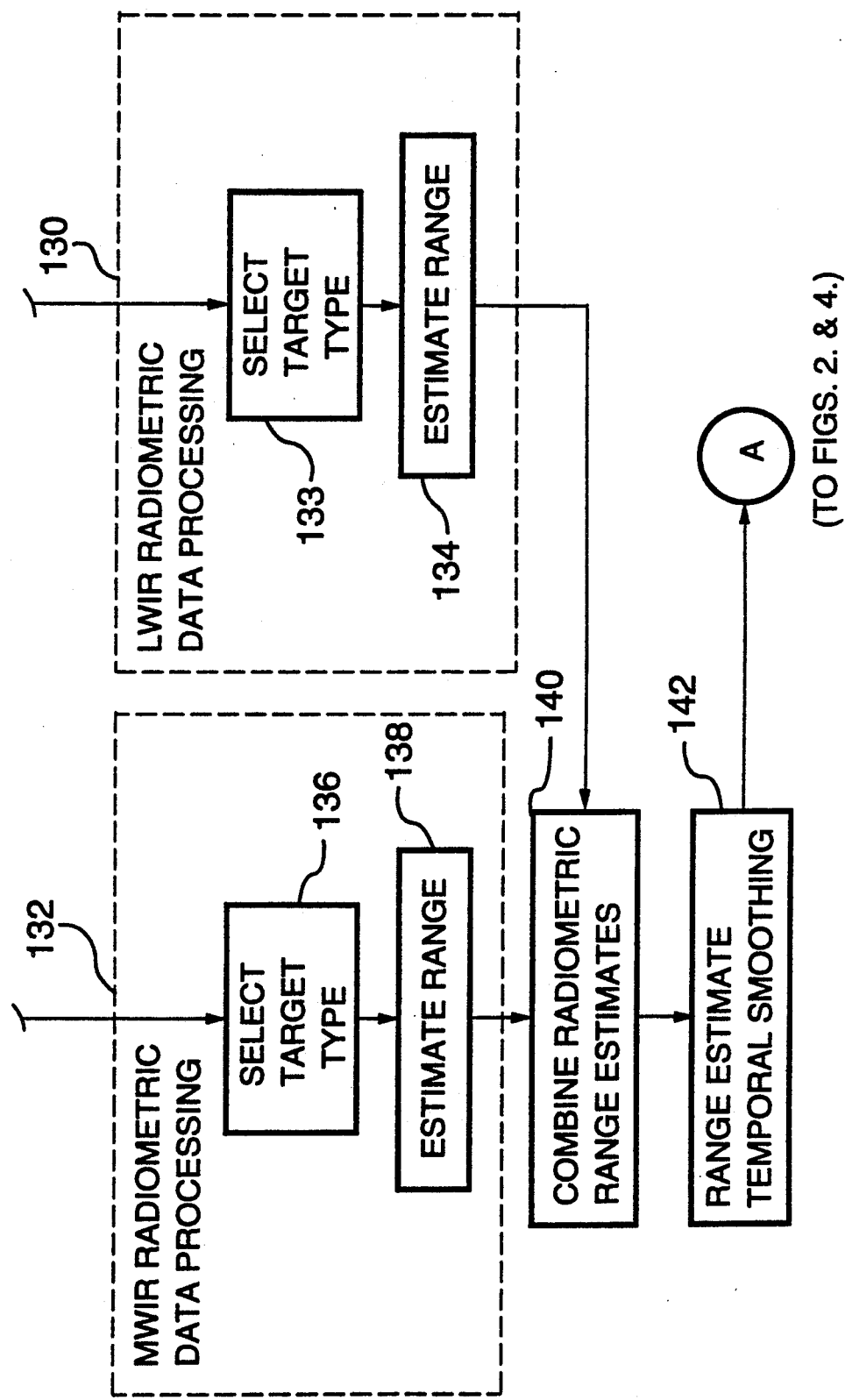

PASSIVE RANGING TECHNIQUE FOR INFRARED SEARCH AND TRACK (IRST) SYSTEMS

BACKGROUND OF THE INVENTION

1. Field of the Invention

This invention relates to a method and system for the passive determination of the range and type of a target.

2. Description of the Related Art

A passive infrared search and track (IRST) system is described in U.S. Pat. No. 4,221,966 issued Sep. 9, 1980 to Kerr et al. These IRST systems used to detect and track airborne targets currently lack the capability to provide operationally useful estimates of target range and/or velocity. Providing this capability would be a significant enhancement to the performance of the IRST, and ultimately, the naval combat system in the self-defence of the ship. An effective ranging function could help alleviate the difficult target/clutter discrimination problem all IRST systems encounter, permitting potentially quicker and more reliable target designation and prioritization. Potential advantages to the naval combat system include:

(a) An increase in the combat system effectiveness against fast sea-skimming Anti-Ship Missiles (ASM) especially if the ASM deploys electronic countermeasures to disrupt tracking radar or are passive.

(b) Improvement in the ship defence capability in emission controlled (EMCON) conditions when active ranging methods may alert or direct the threat to the ship.

(c) An enhanced Threat Evaluation and Weapon Assignment (TEWA) process that is less vulnerable to hostile electronic counter-measures

SUMMARY OF THE INVENTION

According to the present invention, there is provided a method for the passive determination of the range and type of a target, comprising the following steps: (a) intermittently estimate atmospheric transmittance from available meteorological data and intermittently estimate background spectral radiance from meteorological data or spectral radiance sensors; (b) at each of consecutive observation times: (i) measure the contrast irradiance in the direction of a target as well as the azimuth and elevation of said target; (ii) considering step (b)(i), indicate whether said target has a radially inbound trajectory; (iii) estimate a range for said target, as follows: select a target type from a library of target types storing signatures of the target types considering the measured contrast irradiance as well as the measure of the contrast irradiance at the previous observation time, if any; estimate the range of the target considering the selected target type, said estimated atmospheric transmittance and background spectral radiance and the measured contrast irradiance; (iv) where the target has other than a radially inbound trajectory, estimate a range for said target as follows: estimate a trajectory for said target; select a target type from said library, considering the estimated trajectory; estimate the range of said target considering the selected target type, the angular movement of the target, and the range estimate for the target made at the previous observation time; and (v) select a target type and range based on the selections and estimations from step (iii) and step (iv).

According to another aspect of the present invention, there is provided a system for the passive determination of the range and type of a target, comprising the following: atmospheric estimation means to estimate atmospheric transmittance; background spectral radiance measurement means; measurement means to measure, at each of consecutive observation times, the contrast irradiance in the direction of a target as well as the azimuth and elevation of said target; storage means to store measurements made by said measurement means and determinations made by radiometric means and kinematic means; radially inbound trajectory determination means to determine whether said target has a radially inbound trajectory; library means to store a library of target types along with signatures of each target type; said radiometric means being responsive to said radially inbound trajectory determination means, said library means, said measurement means, said storage means, and said atmospheric estimation means to select a target type and range; and said kinematic means being responsive to said radially inbound trajectory determination means, said measurement means, said storage means, and said library means to estimate a trajectory, range, and target type for said target.

BRIEF DESCRIPTION OF THE DRAWING

In the figures which discloses example embodiments of the invention.

DESCRIPTION OF THE PREFERRED EMBODIMENTS

Figure 1:
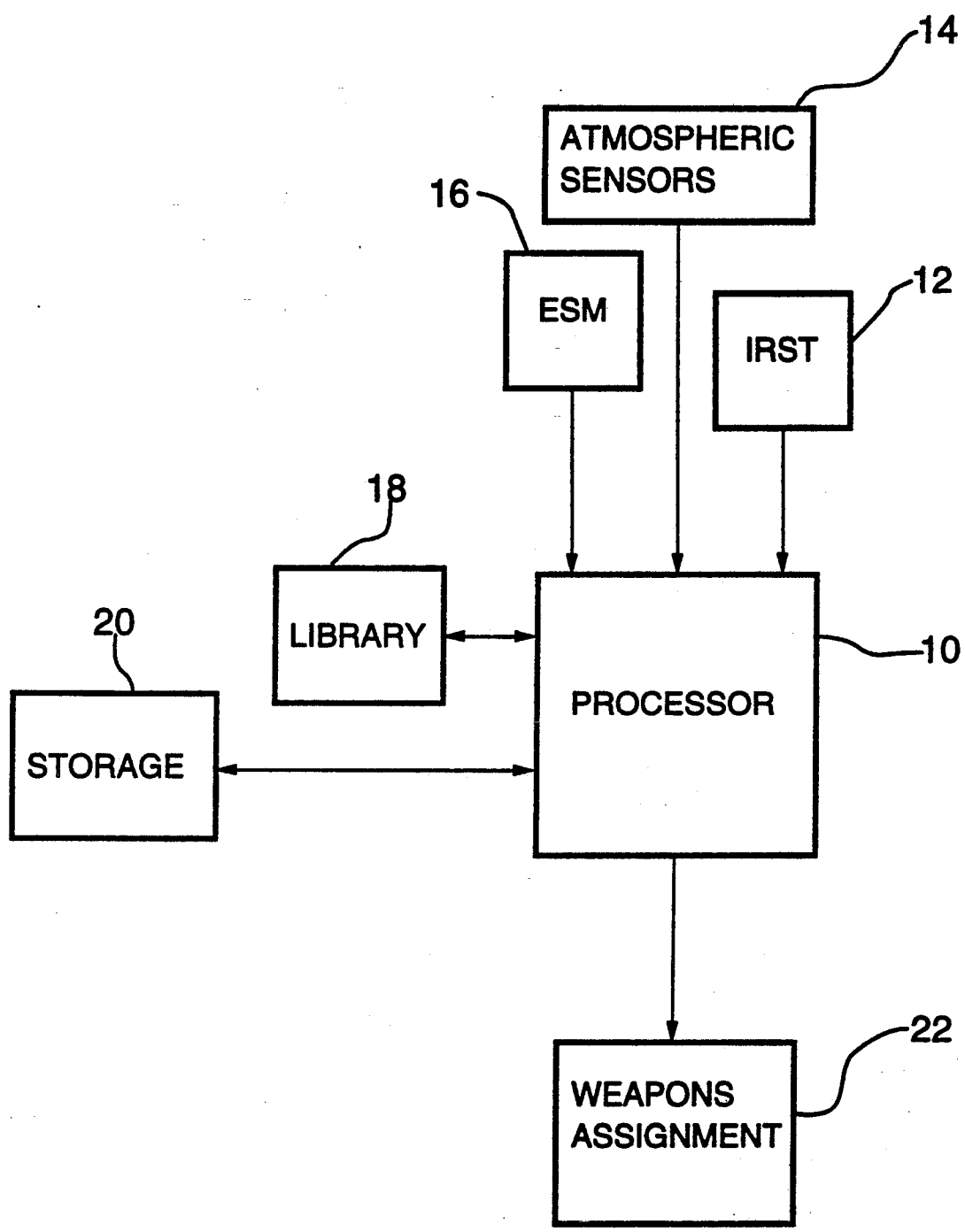
FIG. 1 is a block diagram illustrating a system incorporating this invention, and FIGS. 2 to 5 comprise a logic diagram illustrating the method of this invention.

The sensor of an IRST system measures irradiance at its aperture. When a target is detected, in an ac coupled sensor, the contrast irradiance (CI) is monitored, where:

$$CI = w(N_{tot} - N_{ss})$$

and w is the sensor instantaneous field of view;

$N_{tot}$ is the total radiance measured in the direction of the target;

$N_{ss}$ is the sensor to space spectral radiance.

The sensor also provides an indication of the elevation and azimuth of the target.

In the subject invention, where the target is radially inbound, a radiometric technique is used in the determination of the range. A kinematic technique is used in this determination when the trajectory is not radially inbound or where the elevation of the target is changing. These techniques are first discussed individually.

Radiometric Technique

1. Single Spectral Band Range Estimation

As will be apparent to those skilled in the art, when a target is detected at long range, the following approximation may be derived for the contrast irradiance:

$$CI = (\lambda_2 - \lambda_1) \frac{e^{-\alpha R1 + \beta}}{R^2} \cdot \int_{\lambda_1}^{\lambda_2} [J_T(\lambda, T_s) - A_T N_{BB}(\lambda, T_a)] d\lambda$$

where the following approximation has been used:

$$N_{BG} \approx \tau(R) N_{BB}$$

and where:

$\lambda_{1,2}$ = spectral bandedges

R = slant range from sensor to target alpha and beta are determined by a least squares curve fit to the average atmospheric extinction co-efficient as a function of range;

$A_T$ is the projected area of the target;

$J_T$ is the inherent radiant intensity of a target and is also a function of eta, which is the band average emissivity of the target;

$N_{BB}$ is the background radiance;

$N_{BG}$ is the target background radiance;

$T_a$ is the ambient atmospheric temperature;

$T_s$ is the stagnation temperature of the airframe skin of the target and is defined as $T_S = T_a(1 + 0.16M^2)$, for a target travelling at mach M; and tau(R) is the average atmospheric transmittance.

There are two principal atmospheric windows which exhibit relatively low attenuation for infrared radiation detection: the 3-5 and 8-12 micrometer wavelength spectral bands. The 3-5 micrometer waveband, referred to as the Midwave Infrared (MWIR) region, is characterized by a dominant $CO_2$ molecular absorption line from approximately 4.18-4.45 micrometers and a strong $H_2O$ absorption tail from 4.45 to 5 micrometers. These strong absorption lines cause the transmission to decrease more rapidly at distances near the radiation source than at long ranges. In contrast, the 8-12 micrometer region, referred to as the Long Wave Infrared (LWIR), consists of numerous but relatively weak molecular absorption lines that reduce the transmission at a relatively constant rate with range from the source. Therefore, measurements made by the IRST sensor may be in one or both of these bands. Indeed, measurements in two or more sub-bands in one or both of the MWIR and LWIR bands may provide performance advantages.

The parameters alpha, beta, and $N_{BG}$ may be determined from measurements of the local meteorological conditions. In this regard, known atmospheric modelling programs may be employed such as LOWTRAN 7$^{tm}$ and FASCODE$^{tm}$ produced by the Optical/Infrared Technology Division, Air Force Geophysics Laboratory, Hanscom Air Force Base, Mass. Alternatively, $N_{BG}$ may be determined directly by an adjunct sensor or by the IRST sensor itself. It will therefore be apparent that with the additional information regarding the contrast irradiance which is supplied by the IRST, the target range can be determined from the foregoing equation if the inherent radiant intensity of the target and the projected area of the target may be determined.

A target is a threat primarily when it is radially inbound. Where the target is radially inbound, knowledge of the target type provides values for the remaining unknowns. More particularly, with a radially inbound trajectory, the azimuth aspect angle (degrees from nose) is zero and the elevation aspect angle may be assumed if the target type is known for the reason that a given target type has an expected attack angle. Therefore, knowledge of the target type yields the projected area of the target. The inherent radiant intensity of the target may be determined if the target speed and band average emissivity are known. Emissivity of a radially inbound target is a constant for a given target type. Furthermore, knowledge of the target type would provide an indication of the speed of the target. The approach for a determination of target type is presented hereinafter.

If the target is not radially inbound, the determination of values for the inherent radiant intensity and projected area of the target is more complex, but still possible, as follows.

If the apparent target trajectory is tracked and the target type is known, the projected area of the target may be determined. More quantitatively, the true aspect angle, AA, of a target may be expressed as follows:

$$AA = SQRT(EA^2 + NAA^2)$$

wherein:

EA is the elevation angle, or angle of attack which is considered to be a constant for any particular target type;

NAA is the nominal aspect angle which is defined as the angle between the target velocity vector and the target to sensor line-of-sight.

The projected area may then be given as:

$$A_T = [abs(cos(AA)) + SF * sin(AA)] * A_F$$

where:

SF is the side to frontal area of the target which may be expressed as (4/pi) * missile geometrical aspect ratio; and $A_F$ is the frontal area of the target.

Regarding the inherent radiant intensity of the target, it is noted that the spectral signatures of airborne targets including aircraft, missiles and birds have emission and reflection components. Both components may be a combination of spectrally selective and continuum grey-body radiation. In the case of aircraft and missiles, continuum grey body radiation is produced by thermal emission due to aerodynamic skin heating and visible hot engine parts whereas the engine exhaust plume is a selective radiator which typically has strong $CO_2$, carbon particles and water vapour emissions. Thus, the inherent radiant intensity of the target, $J_T$, is the sum of three contributions: skin heating, SH; plume radiation, PR; and tailpipe radiation, TR.

The skin heating contribution may be rendered as follows:

$$SH = eta * A_T * BBF(T_S, lambda)$$

where:

eta is the emissivity;

$A_T$ the projected area;

BBF($T_S$, lambda) is the Planck blackbody function which is a function of temperature and wavelength; here the temperature is $T_S$, the stagnation temperature, and the wavelength, lambda, is the wavelength being sensed.

An expression for the exhaust plume contribution may be derived from the following. The plume spectral signature, RPS, is determined by the target type and the wavelength. Also, the magnitude of the plume, MP, is dependent on target type. The plume is assumed to be proportional to the square of the target speed, M, on the basis that the plume is dependent on the motor thrust, which is in turn dependent on the aerodynamic drag. The variation of the plume radiation with aspect angle is assumed to be approximately sinusoidal. The actual variation with aspect angle varies depending on the target type, but the sinusoidal dependence is fairly representative. The aspect angle used is the true aspect angle, AA, multiplied by a factor of 5/6. The introduction of this factor is purely empirical, but it ensures that at nose-on aspect for an angle of attack of for example 3 degrees (which typifies certain missiles), the fraction of the exposed plume amounts to about 5% of the side-on plume radiation and at tail-on aspect it gives 50% of its maximum. The exhaust plume contribution is therefore given by the following:

$$EP = MP * M^2 * RSP * \sin(AA * 5/6)$$

Defining the nominal aspect angle, AAN, as the angle between the target velocity vector and the target to line of sight, the radiation from the tailpipe is assumed zero for nominal aspect angles of between 0 and 90 degrees. It is therefore a factor for nominal aspect angles of between 90 and 180 degrees. The tailpipe radiation is given by the aforenoted Planck blackbody function, BBF($T_{TP}$,lambda) with the temperature, $T_{TP}$, being the tailpipe temperature. The aspect variation of this radiation is assumed to be governed by a cosine squared dependence on AAN. Under these assumptions, for a tailpipe of area $AT_P$, the contribution of the tailpipe is given by:

$$TR = 0 \quad \text{for } AAN < 90$$
$$TR = A_{TP} * BBF(T_{TP}, \text{lambda}) * [\cos(AAN)]^2 \quad \text{for } AAN > 90$$

While an indication of the target speed is available once the target type is known, where a target is radially inbound, the contrast irradiance also allows for a direct determination of a speed bound for the target, as follows. The amount of grey body emission versus plume emission from a target depends upon the target type. In any event, where the aspect angle of the target is small, the target evidences a greater degree of grey body emission (in other words, the proportional emission due to the plume decreases). For targets with predominantly grey-body signatures, the radial velocity bound of such a target can be determined from the zero-range spectral ratio limit described as:

$$\frac{CI_{12}(R=0)}{CI_{34}(R=0)} \simeq \frac{\lambda_2 - \lambda_1}{\lambda_4 - \lambda_3} \frac{\int_{\lambda_1}^{\lambda_2} \frac{\epsilon_{12} W_T(M,\lambda)}{\pi} d\lambda - N_{BG12}}{\int_{\lambda_3}^{\lambda_4} \frac{\epsilon_{34} W_T(M,\lambda)}{\pi} d\lambda - N_{BG34}}$$

where the contrast irradiance is measured in two spectral bands 12 and 34 and where for clarity, the target radiance is expressed in terms of the spectral radiant emittance—$W_T$ as a function of speed and wavelength—of a lambertian target travelling at a Mach M. The two spectral bands for measurement are best chosen as the aforenoted LWIR and MWIR bands. Since the range is unknown, this radial velocity determination returns a target speed bound.

2. Spectral Ratio Range Estimation

As an alternative to the single band range estimation equation, the range can be estimated from a ratio of the target contrast irradiances in two spectral bands given by $$\frac{CI_{12}}{CI_{34}} \simeq \frac{(\lambda_2 - \lambda_1) \int_{\lambda_1}^{\lambda_2} [N_T(\lambda) - N_{BB}(\lambda, T_a)] d\lambda}{(\lambda_4 - \lambda_3) \int_{\lambda_3}^{\lambda_4} [N_T(\lambda) - N_{BB}(\lambda, T_a)] d\lambda} \cdot$$

-continued
$$e^{-(\alpha_{12} R_1 + \beta_{12} - \alpha_{34} R_1 + \beta_{34})}$$

The additional spectral information has replaced the dependence of the range on the target's projected area as was the case for the single band range estimation equation. However, the inherent radiant intensity, $J_T$, of the target (and hence the spectral emissivity and the target speed), are implicit in the target radiance $N_T$. Nevertheless, given the atmospheric extinction parameters, alpha and beta, the target background radiances, $N_{BG}$, in the two bands (and recalling the aforedescribed relationship between $N_{BB}$ and $N_{BG}$), and the target speed and emissivities, the range can be found by solving the above nonlinear equation. As aforenoted, alpha and beta may be determined from meterological data, $N_{BG}$ may be determined from such data or from spectral sensors, and the target speed and emissivity are available once the target type is known. It will be realised by those skilled in the art that spectral ratio range estimation can be used to determine range with a radially inbound target (by valuing $J_T$ as aforenoted for a radially inbound target) and with a non-radially inbound target (by valuing $J_T$ as aforenoted for a non-radially inbound target).

It will be noted that the range becomes indeterminant where:

$$R = \left[\frac{\alpha_2}{\alpha_1}\right]^{\frac{1}{\beta_1 - \beta_2}}$$

For typical MWIR and LWIR transmission parameters, the indeterminant range may have a value of on the order of 15 km; a critical point for the combat system. To avoid this problem, closely spaced spectral bands may be selected so that the indeterminant range is beyond the horizon. Thus, bands such as the 3 to 4 and 4 to 5 micrometer bands of the MWIR are preferred for use with this ranging method.

Kinematic Technique

If a range and speed are available from either radiometric technique and the target is not radially inbound or the elevation of the target changes, then the changing azimuth and elevation information from the IRST sensor, along with an indication of whether the contrast irradiance is increasing, indicates a probable trajectory and acceleration of the target. This information can be used to propagate the range and speed of the target forward in time and can also provide additional information as to the target type.

System

With reference to FIG. 1, a processor 10 receives inputs from an IRST system 12, atmospheric sensors 14 and Electronic Support Measure (ESM) systems 16. The IRST system 12 repetitively scans the horizon in order to provide radiance information for any given section of the horizon at regular observation times. The processor is connected for two-way communication with a library 18 and a storage unit 20; the storage unit 20 stores data input to the processor as well as data calculated by the processor so that such data is available during each scan. The library 18 stores an indication of each anticipated target type along with the signature for each anticipated target type. The parameters of the signature for a target which are stored in the library depends upon the which of the aforedescribed radiometric techniques is used by the system. The stored signature of a target may include such things as its expected speed, maximum speed (which for certain targets, e.g. certain missiles, will be the same as the expected speed), maximum altitude, emissivity in each of the MWIR and LWIR bands, projected area for a zero degree azimuth target aspect angle (with the expected attack angle) and whether it is a maneuvering target (e.g., missile versus aircraft). The processor outputs to weapons assignment system 22. The control for the processor 10 is illustrated in FIGS. 2 to 5.

Figure 2:
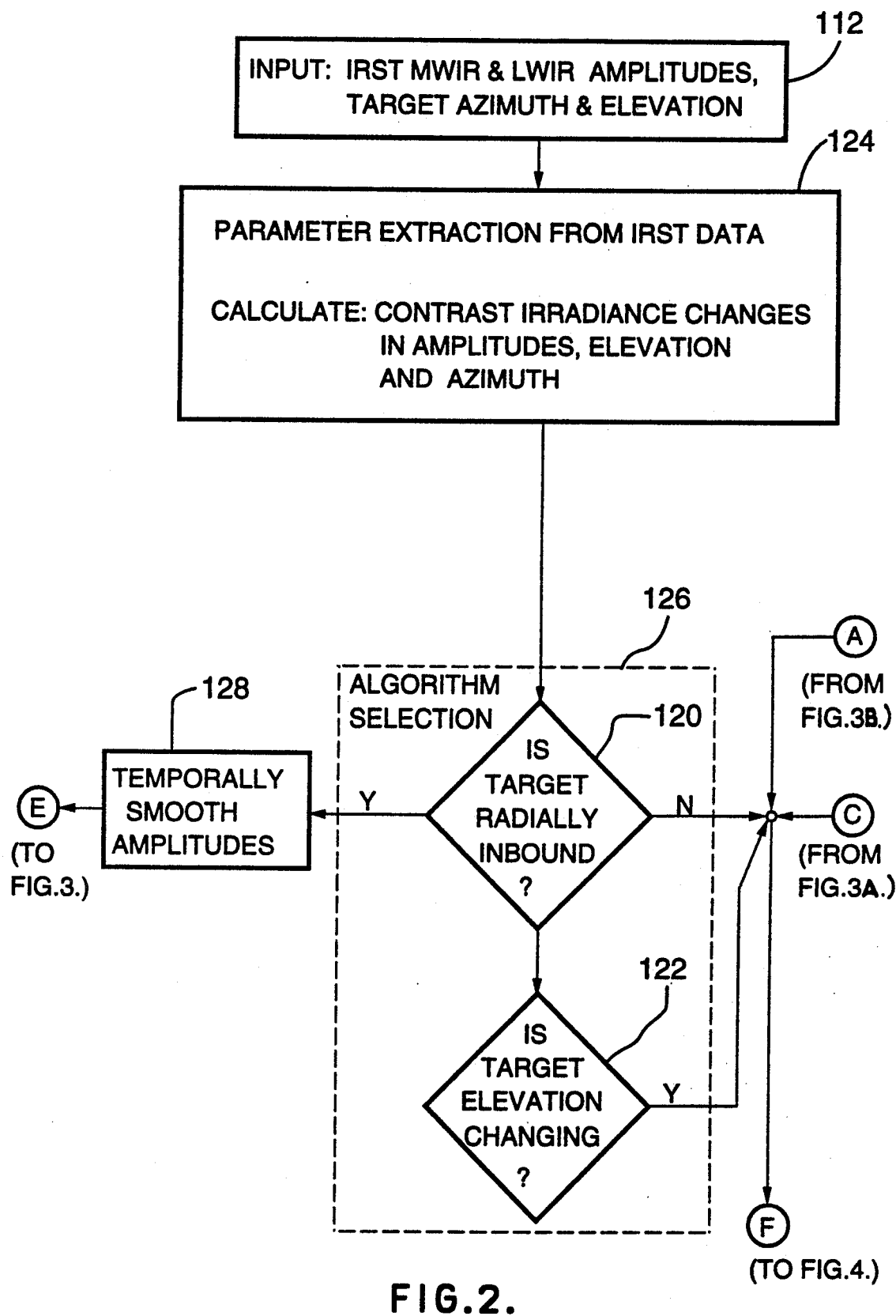

FIGS. 2 to 5 are first described assuming that the system is utilising the radiometric technique of single spectral band range estimation for radial inbound targets. With reference to FIG. 2, IRST data 112 from the IRST system inputs extraction block 124 of the processor control which extracts from the data, at regular observation times, a measure of the contrast irradiance in both the LWIR and MWIR bands for any detected target along with the azimuth and the elevation for the target. This observational data inputs selection block 126. The selection block determines whether, or not the detected target has a radially inbound trajectory (block 120) and whether or not the elevation of the target is changing (block 122), as follows. If the target is newly detected, a radially inbound trajectory and a constant elevation is assumed, otherwise, the measured azimuth and elevation of the target is compared with the azimuth and elevation of the target at the immediately preceding observation time (scan) of the target. If there is no change in the azimuth, the target trajectory is considered radially inbound; a determination is also made as to whether the elevation is changing.

Where the selection block 126 determines the target trajectory is radially inbound, radiometric processing techniques are employed as follows. The observational data is passed to smoothing block 128 which temporally smooths the measured contrast irradiance to reduce scintillation noise variance. One smoothing technique is a three scan moving average of the contrast irradiance. Turning to FIG. 3, the observational data is then passed to LWIR radiometric data processing block 130 and MWIR radiometric data processing block 132.

Figure 4:
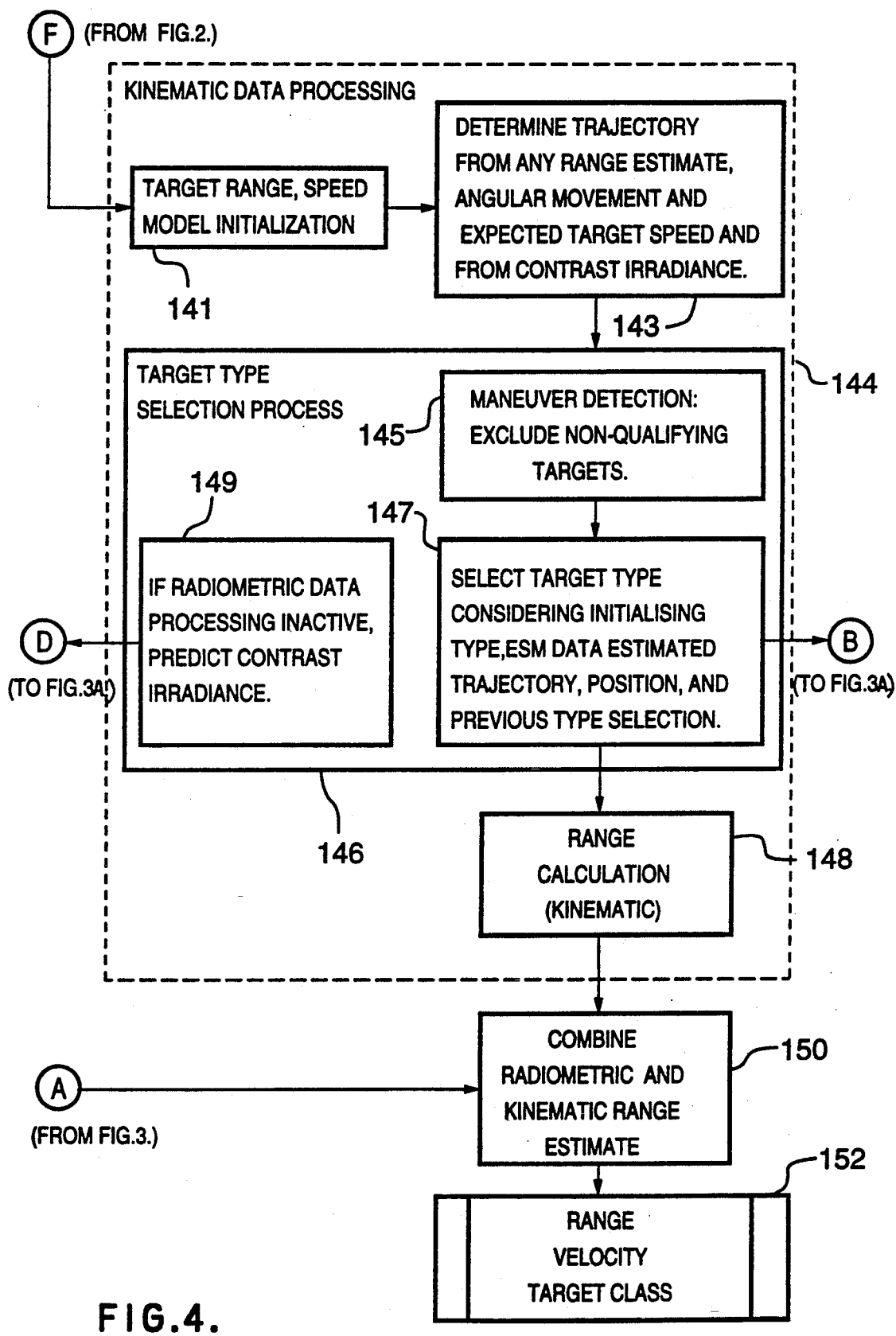

Meteorological data 114 from the atmospheric sensors inputs atmosphere parameter determination block 129 of the processor control. Block 129 outputs a value for the aforenoted parameters alpha, beta and $N_{BG}$ for each of the LWIR and MWIR spectral bands to blocks 130 and 132. Any data 116 from available ESM systems as to the probable target type also inputs blocks 130 and 132 as does target model library data 118, and contrast irradiance any current scan target type selection prediction from kinematic target type selection block 146 (FIG. 4).

Figure 5:
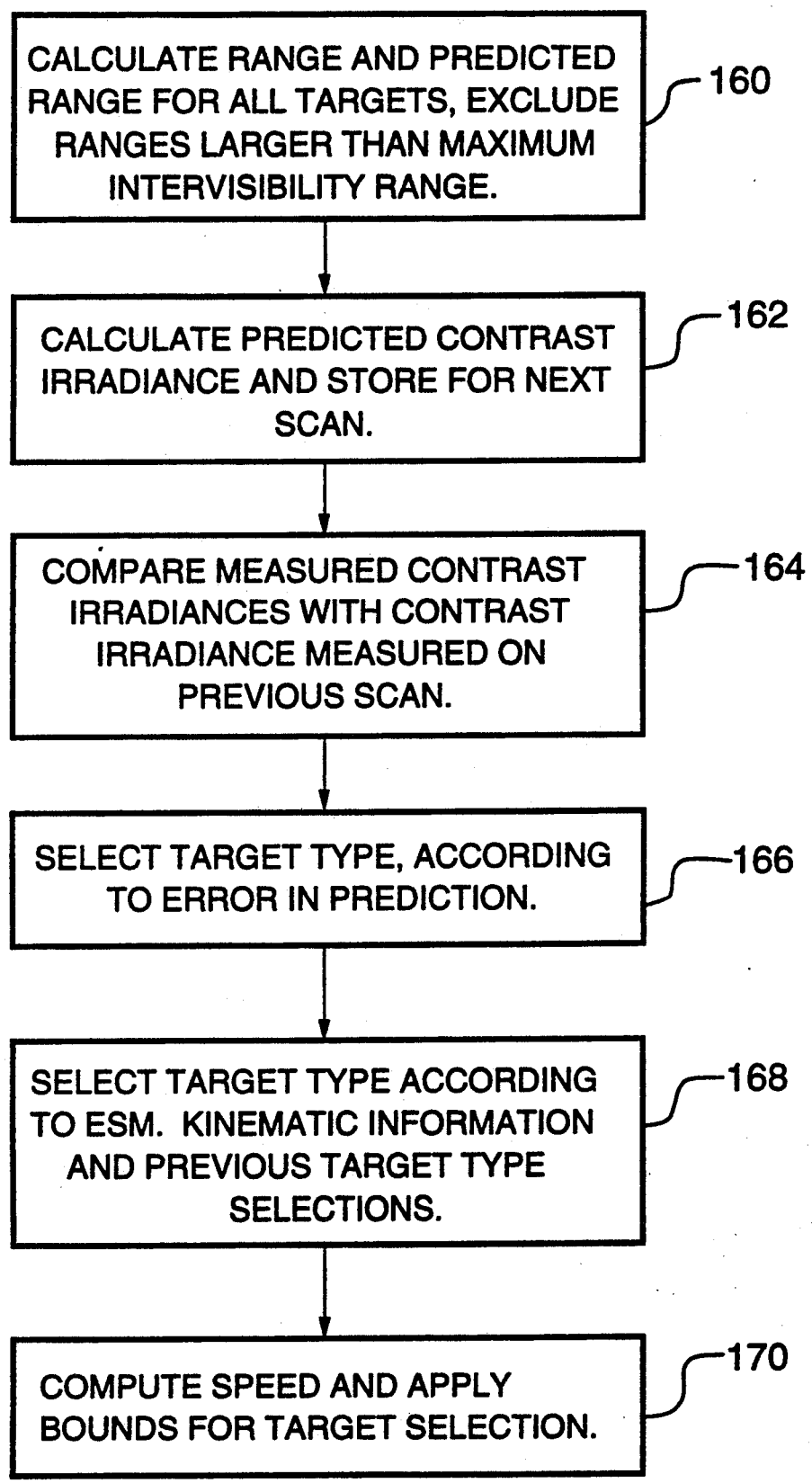

Processing through LWIR processing block 130 commences with the selection of a target type at block 133. The procedure for target type selection in block 133 is detailed in FIG. 5. Turning to FIG. 5, target type selection. proceeds as follows:

1. Given N target signature library target types and given a temporally smoothed peak amplitude measurement of the target, calculate the current estimated range and the predicted range for the next scan (observation time) for each target type—utilizing as the assumed speed the expected speed for each target type from the library data. For those target types which have altitude constraints, compute the maximum intervisibility range given the measured target elevation. Exclude target types whose predicted range exceeds their maximum intervisibility range. (Block 160)

2. Calculate the predicted amplitude (contrast irradiance) for the next scan based upon the predicted range for each target type and store this for the use in the next scan. (Block 162) If this is the first scan of a newly detected target, skip to step 6.

3. Calculate the percentage difference between the measured amplitude and the amplitudes which were predicted in the previous scan for the current scan based on each target type. (Block 164)

4. Compute the median percentage for all target types that are within $+/-50\%$ of the measured amplitude. If none fall within the bounds then use all target types. (Block 166)

5. Select the target types that are within $+/-5\%$ of the median error as computed in (4). If none fall within the bounds then use all target types in (4). (Block 166)

6. Exclude target types based on any ESM data, any selection from kinematic target type selection block 146 and the history of the target type selected (to prevent target switching due to signal intermittents which may, for example, be caused by atmospheric mirages) and from the remaining target types, choose the target type nearest to the median error or, where the target is newly detected, randomly choose a target type. (Block 168)

7. Calculate the speed bound for the selected target type and if the expected speed of the selected target type falls outside of the speed bound, repeat from step 5 (unless the target is newly detected, in which case repeat from step 6) excluding the selected target type. (Block 170) Returning to FIGS. 3A and 3B, the next step (step 8) is to calculate the range for the current scan using the selected target type. (Block 134)

The range calculations are made using the measured LWIR contrast irradiance. Processing proceeds similarly through MWIR processing block 133, target type selection block 136 and range calculation block 138.

In combining block 140, the range calculated at blocks 134 and at block 138 for each spectral band are weighted and combined. The weights are a function of the variance of the measured and predicted contrast irradiance and the confidence level of the variance estimate. The resultant range is passed through a Kalman filter in block 142 which temporally smooths the value. The smoothed estimate of the range, the expected speed, and the target type are passed to block 144 of the kinematic data processing scheme (See A in FIG. 2) in order to initialise same. Further, with reference to FIG. 4, these estimates are passed to block 150 where they are combined with any estimates of the kinematic data processing scheme in the current scan to result in final estimates which are output to block 152 where they are passed to a weapons assignment system.

Returning to FIG. 2, where the selection block 126 determines the target trajectory is not radially inbound (block 120) or the elevation of the target is changing (block 122), the observational data is passed to kinematic data processing block 144 of FIG. 4. Turning to FIG. 4, since on the first scan the target is assumed to be radially inbound with a constant elevation, this will only occur at the earliest on the second scan when an initialising value for the, range, speed, and target type are available (see block 141) from block 142 (FIG. 3) of the radiometric processing scheme. Kinematic data processing then proceeds as follows:

1. Based on the range and speed calculated on the last scan and on the angular movement and contrast irradiance (i.e., increasing or decreasing) of the target, determine a target trajectory. (Block 143)

2. Based on the target trajectory and past information relating to any change in trajectory of the target, exclude target types that could not achieve such maneuvering and pass this information to radiometric data processing blocks 130 and 132 if such blocks are active in the current scan. (Block 145 and 147)

3. Based on step 2 and the initialising target type along with the historic target type and any ESM data, select a target type. (Block 147)

4. Based on the initialising range, the expected speed for the selected target type and the angular movement of the target, calculate the current range for the target. (Block 148)

5. If the radiometric processing scheme is inactive in the current scan, based on the initialising range for the target and the present trajectory for the target, predict a range for the next scan for each target type and convert this to a predicted contrast irradiance for each target type and store this information for use in the next scan by the radiometric processing scheme. (Block 149)

The kinematic processing scheme is inactive when the trajectory of the target is radially inbound and the target's elevation is constant. Where the target has a non-radial trajectory, the radiometric processing scheme is inactive. However, where the target's trajectory is radial and its elevation is changing both schemes are concurrently active. Where both the radiometric and kinematic processing schemes are active, their range estimates and target type selections are weighted according to their confidence levels and combined in combining block 150. The resultant range, target type and speed are stored for use in the next scan and are passed through block 152 to the weapons assignment system.

On the next scan, the process repeats. The atmospheric parameters generally need not be updated every scan, but instead are updated intermittently. Information passed to the weapons assignment system is used to allocate and target available counter-attack weapons.

Where the system utilises the single spectral band range estimation technique which is unrestricted to radially inbound targets, the processor control is modified slightly, as follows. The selection block 126 passes the observational data to the radiometric processing blocks during each scan. The selection block also passes the observational data to the kinematic processing blocks during a scan unless it has determined the target trajectory is radially inbound and its elevation is constant. Thus, often both the kinematic and radiometric processing blocks will be active as a result of a single scan. Processing through the LWIR and MWIR processing blocks 130, 132; target type selection blocks 133, 136; and range calculation blocks 134, 138 proceeds as before except that step 7 is omitted if the target is not radially inbound during a particular processing cycle. Processing through the kinematic block 144 is also identical except that step 5 is undertaken during each processing cycle through these blocks. The stored predicted contrast irradiances are combined with the stored predicted contrast irradiances made during processing through the radiometric blocks 130, 132 based on confidence levels for each set of predictions for use by the radiometric processing blocks during the next scan.

Where the system utilises radiometric spectral ratio range estimation restricted to radially inbound targets, processing proceeds as described in connection with use of the system with radiometric single spectral band range estimation technique restricted to radially inbound targets, except as follows. The radiometric processing blocks utilise sub-bands in the MWIR rather than the MWIR and LWIR bands and these blocks work with actual and predicted contrast irradiance ratios between these two sub-bands. Also the kinematic processing blocks, when active, predicts a contrast irradiance ratio in step 5. Where the system utilises radiometric spectral ratio range estimation which is unrestricted to radially inbound targets, the processor control is further modified as described in connection with single spectral band range estimation which is unrestricted to radially inbound targets.

Measurements of contrast irradiance could be made in both the MWIR and LWIR bands as well as in sub-bands of the MWIR and the system modified to employ both radiometric spectral ratio range estimation and radiometric single spectral band range estimation in order to improve robustness. Furthermore, some performance advantages may be achieved for spectral ratio range estimation by utilising two or more sub-bands in the MWIR and two or more sub-bands in the LWIR.

Processing through the radiometric blocks to determine a target type could utilise fuzzy logic or neural networks rather than the aforedescribed calculations of steps 3 to 6. Other modifications will be apparent to those skilled in the art and, accordingly, the invention is defined in the claims.

What is claimed is:

1. A method for the passive determination of the range and type of a target, comprising the following steps:
   (a) intermittently estimate atmospheric transmittance from available meteorological data and intermittently estimate background spectral radiance from meteorological data or spectral radiance sensors;
   (b) at each of consecutive observation times:
      (i) measure the contrast irradiance in the direction of a target as well as the azimuth and elevation of said target;
      (ii) considering step (b)(i), indicate whether said target has a radially inbound trajectory;
      (iii) estimate a range for said target, as follows:
         select a target type from a library of target types storing signatures of the target types considering the measured contrast irradiance as well as the measure of the contrast irradiance at the previous observation time, if any;
         estimate the range of the target considering the selected target type, said estimated atmospheric transmittance and background spectral radiance and the measured contrast irradiance;
      (iv) where the target has other than a radially inbound trajectory, estimate a range for said target as follows:
         estimate a trajectory for said target;
         select a target type from said library, considering the estimated trajectory;
         estimate the range of said target considering the selected target type, the angular movement of the target, and the range estimate for the target made at the previous observation time; and (v) select a target type and range based on the selections and estimations from step (iii) and step (iv).

2. The method of claim 1 wherein step (b)(ii) comprises indicating whether the elevation of said target is changing and wherein step (b)(iv) is also undertaken where the elevation of said target is changing.

3. The method of claim 2 wherein the step of selecting a target type of step (b)(iii) also comprises the following: considering said library of target signatures, predict the contrast irradiance which would be expected in the next observation time for each target type and compare the measured contrast irradiance with the predictions for contrast irradiance resulting from the measurement of contrast irradiance at the previous observation time, if any, and select a target type considering said comparisons.

4. The method of claim 3 wherein the step of estimating a trajectory for said target pursuant to step (b)(iv) comprises considering the range estimated for said target during the previous observation time, the angular movement of the target, and the expected speed of the target type which was selected for said target during the previous observation time.

5. The method of claim 4 wherein step (b)(ii) comprises comparing the measured azimuth with the azimuth of said target measured at the previous observation time, if any.

6. The method of claim 2 wherein the step of measuring the contrast irradiance in the direction of a target comprises measuring the contrast irradiance in two spectral bands.

7. The method of claim 6 wherein the step of estimating a range in sub-part (b)(iii) comprises considering a ratio of between the contrast irradiance measured in said two spectral bands.

8. The method of claim 6 wherein the step of selecting a target type in sub-part (b)(iii) comprises determining a speed bound for the target by considering the ratio between the contrast irradiance measured in said two spectral bands.

9. The method of claim 8 wherein step (b)(iii) is undertaken only when the trajectory of a target is determined in step (b)(ii) to be radially inbound.

10. The method of claim 5 wherein the step of selecting a target type in sub-part (b)(iii) also considers the selection of target type at previous observation times for said target.

11. The method of claim 10 wherein the step of selecting a target type in sub-part (b)(iv) also considers the selection of target type at previous observation times for said target.

12. The method of claim 11 including the step of excluding possible target types considering the measured elevation, the signatures of target types from said library of target types, and the range estimation for said target.

13. The method of claim 11 wherein the step of predicting the contrast irradiance which would be expected in the next observation time for each target type comprises calculating the current range and the predicted range for each target type in said library of target types and calculating the predicted contrast irradiance considering the predicted range.

14. A method for the passive determination of the range, speed, and type of a target, comprising the following steps:

(a) intermittently estimate atmospheric transmittance from available meteorological data and intermittently estimate background spectral radiance from meteorological data or spectral radiance sensors;
(b) at each of consecutive observation times:
(i) measure the contrast irradiance in the direction of a target as well as the azimuth and elevation of said target;
(ii) if the target is newly detected, assume said target has a trajectory which is radially inbound, otherwise determine whether the trajectory of said target is radially inbound by comparison of the measured azimuth with the azimuth of said target measured at the previous observation time;
(iii) estimate a range for said target, as follows:
access a library of target types storing information relating to the signature of each target type including the expected speed of each target type and, considering said library target signatures, predict the contrast irradiance which would be expected in the next observation time for each target type;
where said target is newly detected, assume a target type, otherwise compare the measured contrast irradiance with the predictions for contrast irradiance resulting from the measurement of contrast irradiance at the previous observation time and select a target type considering said comparisons;
estimate the range of the target considering said selected target type, said measured contrast irradiance, and said estimated atmospheric transmittance and background spectral radiance;
(iv) where the target has other than a radially inbound trajectory or where, by comparison of the measured elevation with the elevation of said target measured at the previous observation time, the elevation of said target is changing;
considering the range and speed estimated for the target during the last observation time, and the angular movement of the target, determine a trajectory for said target;
access said library of target types and select a target type considering said estimated trajectory;
estimate the current range of said target considering the selected target type, the range estimated for said target during the last observation time and the angular movement of said target.

15. A system for the passive determination of the range and type of a target, comprising the following:
atmospheric estimation means to estimate atmospheric transmittance;
background spectral radiance measurement means;
measurement means to measure, at each of consecutive observation times, the contrast irradiance in the direction of a target as well as the azimuth and elevation of said target;
storage means to store measurements made by said measurement means and determinations made by radiometric means and kinematic means;
radially inbound trajectory determination means to determine whether said target has a radially inbound trajectory;

library means to store a library of target types along with signatures of each target type;

said radiometric means being responsive to said radially inbound trajectory determination means, said library means, said measurement means, said storage means, and said atmospheric estimation means to select a target type and range; and said kinematic means being responsive to said radially inbound trajectory determination means, said measurement means, said storage means, and said library means to estimate a trajectory, range, and target type for said target.

16. The system of claim 15 further including target newly detected means to indicate whether said target is newly detected and wherein said radiometric means is also responsive to said target newly detected means.

17. The system of claim 16 including combining means to combine any range estimates of said kinematic means with any range estimates of said radiometric means made pursuant to measurements of said measurement means during an observation time.

18. The system of claim 15 wherein said measurement means measures contrast irradiance in each of two spectral bands.

19. The system of claim 18 further including elevation changing determination means for determining when the elevation of said target is changing and wherein said kinematic means is responsive to said elevation changing determination means.

* * * * *